April 23, 1963  J. E. FLEURY  3,087,032
THERMOSTAT CONSTRUCTION
Filed June 22, 1959  2 Sheets-Sheet 1
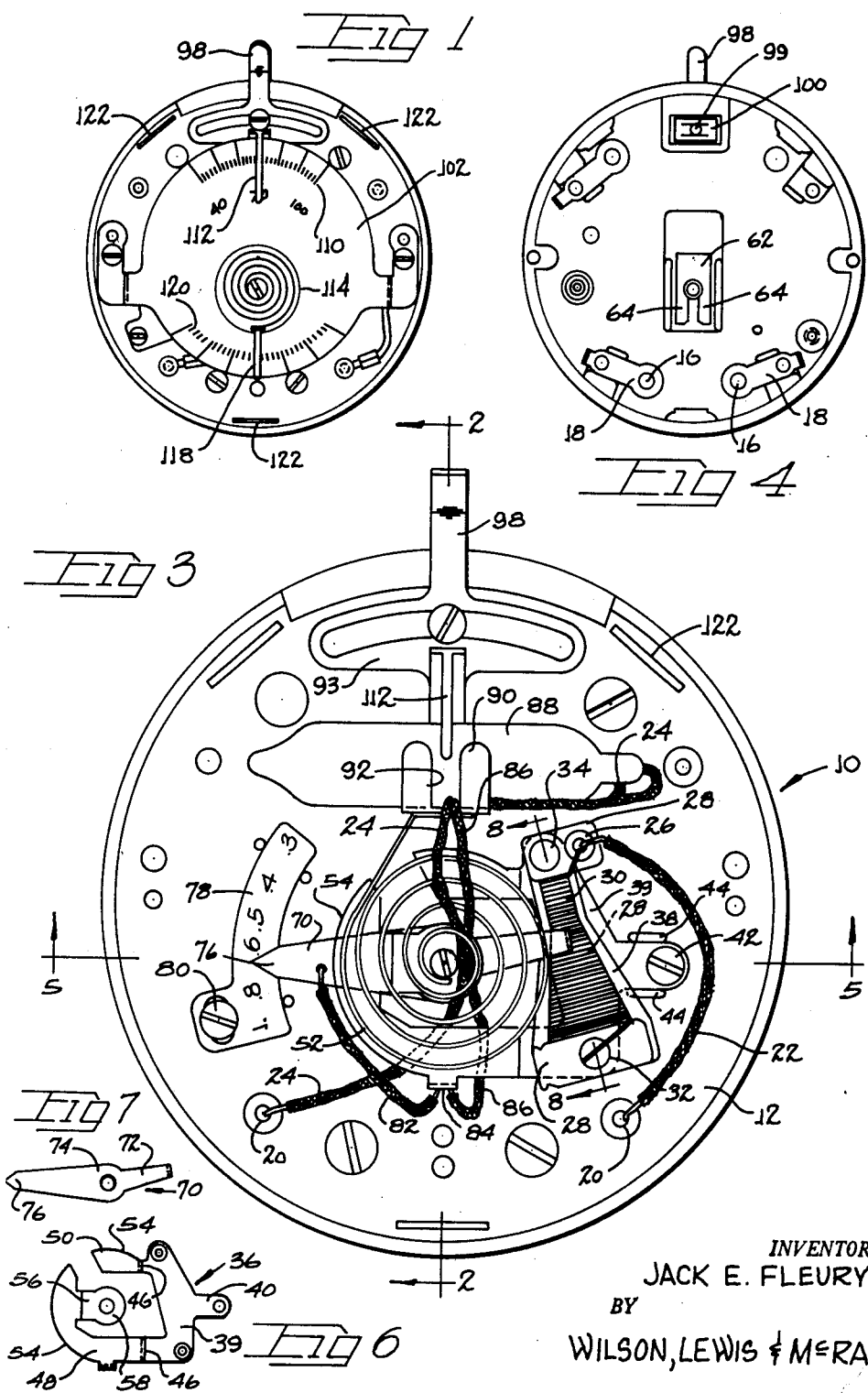
INVENTOR.
JACK E. FLEURY
BY
WILSON, LEWIS & McRAE

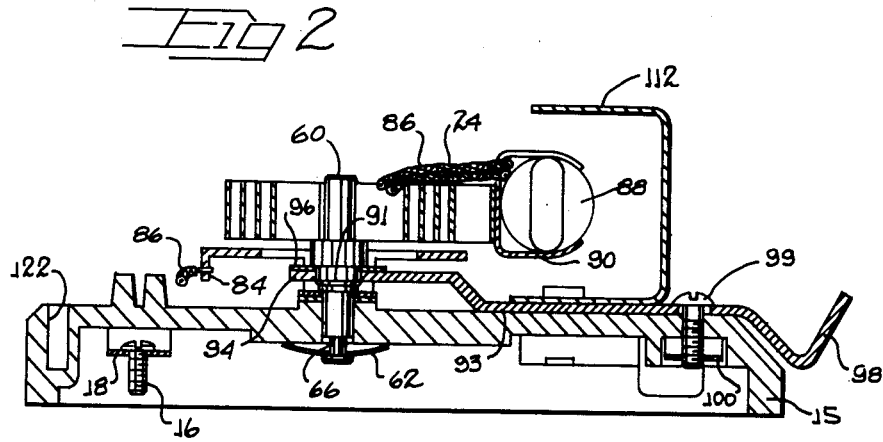
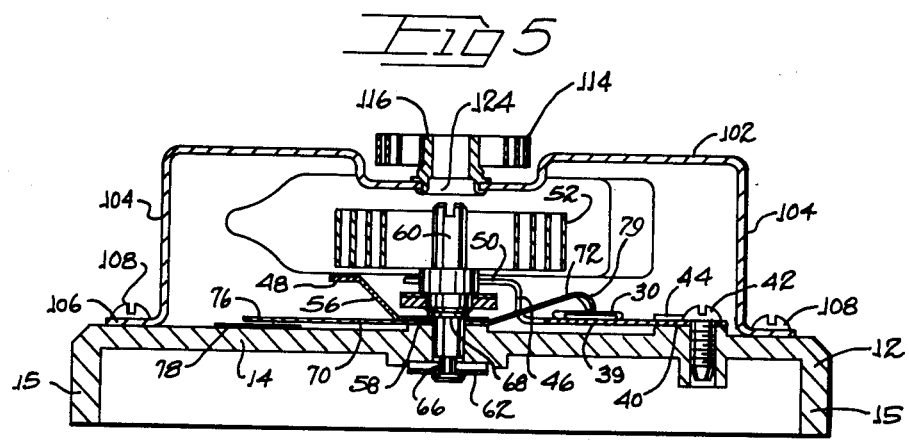
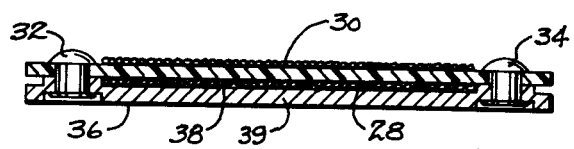

United States Patent Office 3,087,032
Patented Apr. 23, 1963

3,087,032
THERMOSTAT CONSTRUCTION
Jack E. Fleury, Detroit, Mich., assignor to American Radiator & Standard Sanitary Corporation, New York, N.Y., a corporation of Delaware
Filed June 22, 1959, Ser. No. 821,914
7 Claims. (Cl. 200—122)

This invention relates to a room thermostat construction, and particularly to such a construction having improved performance and dependability, coupled with desirable features of adjustability and economy of manufacture.

Over the years various different room heating systems have been developed, and the controls for these various systems have been of necessity somewhat different in construction and operation, due principally to variations in electric current necessitated by different installation conditions. In general, those types of heating systems wherein the thermostat is utilized with a relay will require relatively small current flows through the thermostat, whereas those systems wherein the thermostat is utilized in direct connection with the fuel valve will require relatively larger current inputs to be effective, as for example currents of .6 ampere to 1 ampere.

It is commercially undesirable for the manufacturer to produce a different thermostat for each current requirement, and accordingly there have been developed thermostats with adjustment features thereon for adapting the thermostat to different current inputs. These adjustment features have been incorporated in the type of thermostats that generally are referred to as "anticipating thermostats." The term "anticipating thermostat" denotes a thermostat having a small electrically energized heater adjacent the thermostatic element, the arrangement being such that as the room temperature nears the thermostat setting the thermostat contacts close putting the heating system into operation and energizing the anticipating heater to produce a small amount of heat directly in the thermostatic element before an actual increase in room temperature occurs. As the room temperature incrementally is raised by the furnace the thermostat opens its contacts, and the electric heater is de-energized so that the heat therefrom is rapidly dissipated. The result is such that the temperature of the thermostatic element is rather quickly lowered whereby to permit a relatively quick repetition of the heating cycle. The effect of the arrangement is such that the electric heater anticipates the need for furnace heat, and the furnace is enabled to quickly respond to room temperature differences in a manner to provide a more uniform room temperature than can be provided with thermostats not equipped with the "anticipating" feature.

As previously noted, it is conventional practice to provide the anticipating type thermostats with adjustment features for accommodating the thermostat to circuits of different current strength. Some difficulty has been experienced in providing an anticipating type thermostat which is satisfactorily operable over all current ranges. The apparent source of difficulty has been the fact that adjustment of the heater by the use of a conventional slider construction has inevitably changed the effective location of the heater relative to the thermostatic element, since as the slider is moved along the heater it changes the length and effective surface area of the heater. The arrangement is such that when a relatively large current is flowing through the heater a relatively small heater surface area is formed at one end of the heater, and when the slider is adjusted to handle relatively small currents a relatively large elongated surface area of the heater is presented to the thermostatic element, with the position of the heater in effect changing accordingly as the surface area is changed.

With the above discussion in view, a primary object of the present invention is to provide an anticipating type thermostat wherein the heat directed onto the thermostatic element is substantially constant in all amperage settings of the heater.

Another object of the invention is to provide an anticipating thermostat wherein the heater structure presents a relatively large stationary radiant surface to the thermostatic element so as to deliver substantially the same heat to the element with all current inputs.

A further object of the invention is to provide a thermostat construction of simplified character susceptible to low cost manufacture.

An additional object of the invention is to provide an anticipating type thermostat wherein a heat radiating bracket means is employed in conjunction with the thermostat heater, said bracket means being economically incorporated into the thermostat structure so as to add minimum cost thereto.

A further object of the invention is to provide an anticipating type thermostat having an electrically-energized heater, the arrangement being such that the thermostat components associated with said heater are engaged with one another in good thermal contact so as to ensure uniform heater operation and long service life.

Another object is to provide a room thermostat having a relatively compact arrangement of heater, thermostatic element, and temperature indicator means, whereby to enable construction of the apparatus as a relatively small, low cost item.

Still another object of the invention is to provide a thermostat construction wherein the component parts may be relatively easily adjusted to obtain proper operation thereof.

Other objects of this invention will appear in the following description and appended claims, reference being had to the accompanying drawings forming a part of this specification wherein like reference characters designate corresponding parts in the several views.

In the drawings:

FIG. 1 is a front view of a room thermostat incorporating features of the invention, the thermostat cover plate being removed for illustration purposes.

FIG. 2 is a sectional view taken substantially on line 2—2 in FIG. 3.

FIG. 3 is a front view of the FIG. 1 structure, but taken with the dial plate thereof removed for illustration purposes.

FIG. 4 is a rear elevational view of the FIG. 1 structure.

FIG. 5 is a sectional view taken substantially on line 5—5 in FIG. 3.

FIG. 6 is a plan view of a thermally conductive bracket means employed in the structure of FIGS. 1 through 5.

FIG. 7 is a plan view of a thermally conductive slider means employed in the structure of FIGS. 1 through 5; and FIG. 8 is a fragmentary sectional view taken on line 8—8 in FIG. 3.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, there is shown a room thermostat 10 comprising a base structure 12 formed of plastic or other dielectric material. Base 12 comprises a generally flat central portion 14 and a generally annular peripheral flange portion 15 extended rearwardly therefrom. It will be understood that the thermostat is mounted on the wall of a room with central portion 14 extending generally parallel to the room wall so that flange portion 15 conceals the wall opening through which the thermostat leads are extended. A mounting bracket (not shown) is carried within the space defined by flange 15 for locating the thermostat assembly on the room wall.

The leads to the thermostat are connected with screw-type terminals 16 (FIGS. 2 and 4), carried by metallic tab members 18, said tab members being mounted on electrically conductive rivets which extend through base structure 12 to form connector structure 20 (FIG. 3) for the short flexible conductors 22 and 24.

Conductor 22 has its opposite end portion connected with a metal eyelet 26 in a dielectric insulator 28, said insulator serving to mount the enameled wire turns 30 of an electrical heater, with an end portion of the heater wire extending into connection with eyelet 26 and solder being applied to lock the conductor 22 onto the heater wire and prevent disengagement thereof from the insulator 28. As can be seen from FIGS. 3 and 8, the enameled heater wire is wrapped around insulator 28, with an end of the wire being anchored to rivet 32, the other end of wire 30 being connected with the conductor 22 as explained above.

Rivet 32 cooperates with a second rivet 34 to anchor the insulator 28 onto a bracket means 36, said bracket means being formed of brass sheet or other thermally conductive material whereby a portion of the heat from the heater turns 30 is directed into the bracket means 36 for eventual radiation onto the thermostatic power element of the thermostat. Preferably a thin sheet of electric insulation 38 is interposed between wire turns 30 and the bracket means 36 for preventing any possibility of short circuit around a portion of the heater structure.

Bracket means 36 comprises a generally flat portion 39 having an extension formed with an opening for reception of the screw 42, said screw serving to mount the bracket means on the base structure 12, as shown in FIGS. 3 and 5. The base structure is preferably formed with integrally upstanding portions 44 for facilitating assembly of the bracket means onto the base structure.

The portions of bracket means 36 which receive the rivets 32 and 34 are offset slightly from the general plane of portion 39 as shown in FIG. 8 so as to form a recess for accommodation of the wire turns 30. As can be seen from FIGS. 5 and 6, bracket portion 39 is integrally connected with two upstanding arm portions 46 which lead to offset flat surfaced portions 48 and 50, the arrangement being such that portions 48 and 50 are located closely adjacent edge portions of a thermostatic coil 52 (FIG. 5) so that the heat which is conducted from heater wires 30 through the bracket means is enabled to radiate onto the surfaces of the coil for providing an anticipation of room temperature change. It will be noted from FIG. 3 that the bracket portions 48 and 50 extend in substantial alignment with the outermost convolutions of the thermostatic coil 52, with their peripheral edges 54 being of arcuate configuration so that substantially all of the heat radiated from the bracket means is directed onto the largest convolutions of the coil. The space between bracket portions 48 and 50 is cut away in order to permit easier assembly of the various components and to provide material for forming the extension 56.

Bracket means 36 is mounted in part by means of the extension 56 which angles from the plane of portions 48 and 50 as shown in FIG. 5. End portion 58 of the extension is turned into alignment with the bracket portion 39 and is provided with a circular opening for mounting the bracket means on the rotary post structure 60. It will thus be seen that post structure 60 and screw 42 cooperate to mount the bracket means 36 on the base structure 12.

Post structure 60 is rotatably mounted in base structure 12 by means of a spring clip 62, said clip being of U-shaped configuration as shown in FIG. 4 and having its opposite leg portions 64 engaging the reduced diameter portion 66 of post 60 as shown in FIG. 5. The spring clip is bowed slightly (FIG. 2) so that its leg portions 64 exert an axial force on the post structure tending to cause its shoulder portion 68 (FIG. 5) to tightly engage the bracket portion 58. Post structure 60 is preferably formed of thermally conductive material, and the tight engagement between portions 58 and 68 serves to allow a portion of the heat within the bracket means to be conducted into the post structure for ultimate conduction into the thermostatic coil 52. The thermostatic coil is disposed with its innermost convolution fixedly connected to the post structure 60, as by means of spot welding.

It has been previously pointed out that anticipating thermostats are generally constructed with adustable heaters in order to accommodate the thermostat to different current values. In the illustrated embodiment the adjustment is provided by a rotary slide element 70 having an end portion 72 engaging the heater wire 30 as shown in FIG. 5. The central portion 74 of the slider is apertured to accommodate the post structure 60, and the opposite end portion 76 is given an arrow-shaped configuration for defining a pointer structure. Portion 76 overlies a scale plate 78 fixedly carried on the base structure 12 by means of a screw 80. The indicia on plate 78 are preferably set forth in terms of the current values of the various circuits with which the thermostat is adapted to be employed, the values in the illustrated embodiment ranging from .3 ampere to 1 ampere. Preferably the slider is initially manufactured with portion 72 (exclusive of the curved tip area) in substantial alignment with the portions 74 and 76 so that when the slider is installed into the space between base structure 12 and bracket means 36 (as shown in FIG. 5) the curved tip area 79 is caused to have a good pressure engagement with the wire turns 30, the exposed faces of said wire turns being preferably free of enamel for ensuring a good electrical-thermal contact between the slider structure and heater structure.

It will be noted from FIG. 3 that slider structure 70 is connected with a flexible conductor 82 which has its opposite end electrically connected to a tab 84 on bracket means 36. Tab 84 also mounts one end of a flexible conductor 86, which is extended through the coil convolutions and over to a conventional mercury switch 88. The other lead for mercury switch 88 is provided by a flexible conductor 24 which extends to one of the rivets 20 as previously explained. Mercury switch 88 is mounted in a bracket 90 having a cut away portion 92 for permitting the conductors 24 and 86 to extend through the bracket and coil convolutions without interfering with movement of the movable components. The bracket is suitably secured to the outermost convolution of coil 52 as shown in FIGS. 2 and 3.

Current flow through the illustrated structure takes place from conductor 22, through heater wire 30, slider structure 70, conductors 82 and 86, the switch 88 contacts (including the mercury globule) and conductor 24. The flow of electric current through the circuit causes the heater wires 30 to heat up so as to conduct heat into the bracket means 36, from where it is radiated onto the thermostatic coil 52 via the radiator surfaces 48 and 50. Additionally, slider 70 takes some heat from the heater wires and conducts it to the central portion 74; portion 74 is in good thermal contact with the bracket portion 58 and post structure 60 so that heat is conducted into the post structure 60 from the slider structure and also from bracket means 36, said post structure in turn conducting the heat into the innermost convolution of the thermostatic coil. A further source of heat is in the conductors 24 and 86, it being noted in this connection that these conductors pass through the thermostatic coil convolutions as shown in FIG. 3. The overall arrangement is such that the electrically-created heat cooperates with the room heat to partially unwind the coil and tip the mercury switch structure sufficiently to open the switch contacts and thereby discontinue operation of the furnace or other structure controlled by the thermostat.

After the circuit through the switch contacts is opened the electrically-created heat is rapidly dissipated to the atmosphere so that the thermostatic coil 52 tends to contract somewhat in advance of room temperature change. As a result the switch contacts will be returned to a circuit closed condition sometime before the room temperature can drop appreciably. The general arrangement is such that the furnace is caused to go into operation before the room temperature can be lowered excessively, the effect being such as to provide a substantially uniform room temperature.

When the thermostat is set (by adjustment of slider 70) to handle a relatively large current, the heater structure 30 has a relatively small number of turns in circuit, and the resistance offered by the wire turns is therefore comparatively small. The heat output of the heater is proportional to the heater resistance and square of the current, and the scale plate 70 is therefore marked with current values arranged substantially in accordance with an inverse square relationship. However, since the heater elements 24 and 86 also contribute heat to the thermostatic coil the values are preferably chosen to be slightly less than according to the inverse square relationship in order that the total heat input to coil 52 will be the same for all current settings. The arrangement is such that at low current settings of slider 70 the heater structure 24, 86 delivers very little heat to the thermostatic coil whereas at higher current settings the heater structure 24, 86 delivers a larger heat input to the thermostatic coil; the plate 78 is therefore marked to compensate for this difference, it being appreciated that the general objective is to provide a structure wherein the total heat per unit time into the thermostatic coil 52 is maintained constant irrespective of the current being utilized.

It will be noted from FIG. 3 that as the slider structure 70 is rotated around the axis of post structure 60 the effective location of the heater structure 30 is varied. Thus, when the slider structure is set to handle a relatively large current the heater structure 30 is located adjacent the rivet 34, whereas when the slider structure is set to handle a relatively small current the heater structure 30 is increased in length so as to occupy substantially the entire central space between rivets 32 and 34. If the coil 52 were to depend for its heat input entirely on direct radiation from wire turns 30 this change in effective location would tend to introduce an inaccuracy in the end operation of the device. However, since a substantial portion of the heat is developed from post 60 and the stationary radiator surfaces 48 and 50 this inaccuracy does not exist. The illustrated arrangement has been found to produce uniform operating characteristics over the entire range of current settings.

In most heating systems it is desirable that the room temperature be adjusted in accordance with different desires of the room occupants, and accordingly in the illustrated embodiment there is provided an adjustment lever 93 for varying the temperature setting of the thermostat switch. Lever 93 includes an apertured portion 94 tightly engaged between a washer 96 and a shoulder 91 formed on post structure 60. The shoulder arrangement on post structure 60 is preferably such that lever 93 has a relatively tight frictional fit on the post structure so that manual pressure on the end portion 98 of the lever is effective to rotate the post structure 60 and thereby change the actuation temperature of the switch structure 88. The ease of movement of lever 93 is regulated by a screw 99 extended through a spring clip 100 as shown in FIGS. 2 and 4.

Indication of the thermostat temperature setting is provided by a metal dial plate 102 having integrally formed legs 104 with turned portions 106 seating on base structure 12 and secured thereon by means of screws 108. Dial plate 102 is provided with temperature setting indicia at 110 which cooperates with a pointer structure 112 carried by lever 93 as shown in FIG. 2. It will thus be seen that when lever 93 is manually rotated to change the position of mercury tube 88 the change in temperature setting is made visible at 110 on the dial plate 102.

Room temperature is indicated by the thermometer 114, said thermometer in the illustrated embodiment comprising a bimetal coil having its innermost convolution carried on a tubular support structure 116. The outermost convolution of the thermometer coil is equipped with a pointer structure 118 adapted to cooperate with dial means 120 for visual indication of the room temperature. It will be appreciated that in actual practice a cover plate is provided around the illustrated mechanism, the arrangement being such as to allow room air to circulate between the cover plate and the thermostatic components, particularly the two coils 52 and 114. Mounting of the cover (not shown) may be readily effected by the utilization of conventional spring clip elements (not shown) extendable into the socket portions 122 in the base structure.

Tubular support structure 116 provides an opening at 124 (FIG. 5) which permits adjustment of the thermostatic coil 52 relative to lever 93, as for example to compensate for any slight variations in manufacture of the coil or its assembly onto the other components. The adjustment operation is preferably accomplished by inserting a screw driver through the opening 124 into the screw driver slot in post structure 60 and manually rotating lever 93 relative to the post structure. As previously noted the engagement between lever 93 and post structure 60 is preferably a rather tight frictional fit, but the engagement is preferably not sufficiently tight to prevent the adjusting operation when the screw driver is engaged in the screw driver slot as noted.

From the above description it will be seen that the illustrated embodiment incorporates desirable features of improved heater operation over a range of current settings, improved features of adjustment, and a relatively compact simplified arrangement of parts. It will be appreciated that various modifications from the illustrated embodiment may be resorted to without departing from the spirit of the invention as defined in the accompanying claims.

I claim:

1. The combination comprising a base structure; a post structure rotatably extending from said base structure; a thermostatic coil connected with said post structure and having a plurality of convolutions thereof surrounding said post structure in outwardly spiraling relation thereto; a switch structure operatively connected with the outer end portion of said thermostatic coil for operation thereby; a manually operable means engaging said post structure for adjusting the rotated position of said post structure to establish a temperature setting for operation of the switch structure; a thermally conductive bracket means comprising a central annular portion thermally engaging said post structure, an arm portion extending outwardly from said central portion, a peripherally extending portion connected with said arm portion and located in close adjacency to edge portions of the thermostatic coil, and a seating portion connected with said peripheral portion but offset therefrom; and an electrically energized heater element carried on said seating portion in thermal engagement therewith, whereby when said heater element is energized part of the heat produced therefrom is conducted into the bracket means and distributed to the peripheral portion for radiation therefrom onto the thermostatic coil convolutions.

2. The combination comprising a base; a switch structure located adjacent said base; a thermostatic coil located adjacent said base and operatively connected with said switch structure for actuation thereof; a base-carried rotatable mounting structure for said thermostatic coil; manually operable means frictionally engaged with said mounting structure for transmitting rotational force thereto to regulate the switch-actuation temperature; dial means overlying the thermostatic coil; a hollow tubular support carried on said dial means in alignment with said rotary mounting structure; a thermometer carried on said tubular support and cooperable with the dial means to indicate room temperature; and a thrust connection carried by the rotatable mounting structure and accessible through the opening defined by said hollow tubular support; whereby the thrust connection may be engaged to enable rotation of the manually operable means relative to the mounting structure for adjusting the relation between the thermostatic coil and manually operable means.

3. The combination comprising a base; a post rotatably mounted in said base; a thermally conductive bracket having a portion surrounding said post in thermal engagement therewith, an arm extending from said portion and away from the post, a radiator portion extending from said arm at least partially around the post but spaced therefrom; and an extension connected with said radiator portion; a heater in thermal engagement with said extension; and a thermostatic coil carried on said post and in close adjacency to the radiator portion.

4. In an anticipating thermostat, an electric switch, a thermostatic operator for said switch, an electrically energized heater controlled by said switch, a bracket having a generally circular configuration with a major portion comprising a radiator underlying said operator and a minor portion comprising a heater support adjacent the outer periphery of said operator and carrying said heater, whereby heat from said heater flows through said support to said radiator to provide uniform heating of said operator.

5. In an anticipating thermostat, a base, a thermally conductive post carried by said base, a thermostatic coil carried by said post, a thermally conductive bracket in thermal engagement with said post to conduct heat thereinto, said bracket having a generally circular configuration with a major portion comprising a radiator underlying said coil and a minor portion comprising a heater support adjacent the outer periphery of said coil, and a heater carried by said minor portion, whereby heat produced by said heater is conducted through said bracket and said post and radiated therefrom uniformly onto substantially the entire surface of said thermostatic coil.

6. In an anticipating thermostat, a base, a thermostatic coil positioned in adjacent spaced relation above said base, a thermally-conductive post extending from said base into connection with said coil for mounting thereof, a thermally conductive bracket having a portion anchored to said base and having another portion encircling said post in heat-transmitting relation thereto, whereby said post serves as a partial mounting for said bracket, said bracket having a generally circular configuration with a major portion comprising a radiator underlying said coil and a minor portion comprising a heater support adjacent the outer periphery of said coil, and a heater carried by said minor portion, whereby heat produced by said heater is conducted through said bracket and thence into said coil by said post and by radiation from said radiator.

7. In an anticipating thermostat, a base, a thermally conductive bracket having a first portion thereof anchored to said base, a thermally conductive post extending from said base through a second portion of said bracket and in thermal engagement therewith, a thermostatic coil carried by said post, said bracket having a portion surrounding said post and positioned in close proximity to substantially the entire peripheral edge of said thermostatic coil, an electrically energized heater positioned on a portion of said bracket in thermal engagement therewith and spaced from said coil, current supply means for said heater including a slider of thermally conductive material, said slider including a portion overlapping said second portion of said bracket in thermal engagement therewith and another portion pressuringly engaging said heater, and means maintaining said post, said bracket and said slider in firm pressure engagement with one another, whereby heat from said heater is caused to be conducted into said post via said bracket and slider.

References Cited in the file of this patent

UNITED STATES PATENTS

| 1,881,950 | Rayfield | Oct. 11, 1932 |
| 1,980,756 | Hoover | Nov. 13, 1934 |
| 2,173,083 | Ray | Sept. 12, 1939 |
| 2,200,852 | Pond | May 14, 1940 |
| 2,317,830 | Vaughan | Apr. 27, 1943 |
| 2,473,789 | Crise | June 21, 1949 |
| 2,558,610 | Diekhoff | June 26, 1951 |
| 2,611,855 | Turner | Sept. 23, 1952 |
| 2,847,536 | Bishop | Aug. 12, 1958 |
| 2,847,539 | Pounds et al. | Aug. 12, 1958 |
| 2,855,484 | Kreuter | Oct. 7, 1958 |